United States Patent
Hu et al.

(10) Patent No.: US 10,614,011 B2
(45) Date of Patent: Apr. 7, 2020

(54) APPARATUS, METHOD, AND ELECTRONIC DEVICE FOR IMPLEMENTING SOLID-STATE DRIVE DATA INTERACTION

(71) Applicant: Lenovo (Beijing) Co., Ltd., Beijing (CN)

(72) Inventors: Zezhi Hu, Beijing (CN); Boyong Xin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/875,026

(22) Filed: Jan. 19, 2018

(65) Prior Publication Data

US 2018/0210851 A1    Jul. 26, 2018

(30) Foreign Application Priority Data

Jan. 22, 2017    (CN) .......................... 2017 1 0053784

(51) Int. Cl.
| | |
|---|---|
| G06F 13/364 | (2006.01) |
| G06F 12/02 | (2006.01) |
| G06F 13/42 | (2006.01) |
| G06F 13/40 | (2006.01) |
| G06F 1/06 | (2006.01) |
| G06F 11/30 | (2006.01) |

(52) U.S. Cl.
CPC .............. *G06F 13/364* (2013.01); *G06F 1/06* (2013.01); *G06F 11/3027* (2013.01); *G06F 11/3034* (2013.01); *G06F 11/3041* (2013.01); *G06F 11/3055* (2013.01); *G06F 11/3093* (2013.01); *G06F 12/0246* (2013.01); *G06F 13/4022* (2013.01); *G06F 13/4081* (2013.01); *G06F 13/4291* (2013.01); *G06F 2212/7207* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 9,330,003 | B1 * | 5/2016 | Shah ........................ | G06F 3/067 |
| 9,941,007 | B2 * | 4/2018 | Peddle ................... | G11C 16/10 |
| 2014/0237205 | A1 * | 8/2014 | Takefman ............. | H03M 13/05 711/162 |
| 2017/0286359 | A1 * | 10/2017 | McGowan .......... | G06F 13/4291 |
| 2018/0213669 | A1 * | 7/2018 | Kochukunju ........ | H05K 7/1485 |

FOREIGN PATENT DOCUMENTS

| | | |
|---|---|---|
| CN | 202694228 U | 1/2013 |
| CN | 104133533 A | 11/2014 |
| CN | 203930612 U | 11/2014 |
| CN | 106161169 A | 11/2016 |
| CN | 106201963 A | 12/2016 |

* cited by examiner

*Primary Examiner* — Henry Tsai
*Assistant Examiner* — Aurangzeb Hassan
(74) *Attorney, Agent, or Firm* — Anova Law Group, PLLC

(57) ABSTRACT

An apparatus, a method, and an electronic device for implementing SSD (solid-state drive) data interactions are provided. The apparatus for implementing the SSD data interactions comprising a master controller, a detector, and a retimer coupled between an SSD and a CPU (central processing unit) for: performing signal enhancement processing on information transmitted between the SSD and the CPU; and monitoring a connection status of a data port corresponding to the SSD and send a monitoring result to the CPU.

17 Claims, 4 Drawing Sheets

APPARATUS, METHOD, AND ELECTRONIC DEVICE FOR IMPLEMENTING SOLID-STATE DRIVE DATA INTERACTION

CROSS-REFERENCES TO RELATED APPLICATIONS

This application claims priority of Chinese Patent Application No. 201710053784.8, filed on Jan. 22, 2017, the entire contents of which are hereby incorporated by reference.

FIELD OF THE INVENTION

The present disclosure generally relates to the field of electronic device and, more particularly, relates to an apparatus, a method, and an electronic device for implementing solid-state drive data interaction.

BACKGROUND

Currently, solutions directed towards the hot-plug function of hardware devices (e.g., a solid-state drive, hereinafter referred to as 'SSD') are mainly categorized into two types. The first type of solution is to apply a retimer card to enhance the peripheral component interconnect express ('PCI Express' or 'PCIE' for short) signal. However, while supporting software managed hot plug, such solution fails to support hardware managed hot plug (i.e., surprise hot plug). The second type of solution is to use NVMe Switch developed by Avago. However, while supporting both the software managed hot plug and the hardware managed hot plug, the second type of solution has the drawback of having a high cost.

BRIEF SUMMARY OF THE DISCLOSURE

One aspect of the present disclosure provides an apparatus for implementing SSD (solid-state drive) data interactions. The apparatus for implementing an SSD data interaction, comprising a master controller, a detector, and a retimer coupled between an SSD and a CPU (central processing unit) for: performing signal enhancement processing on information transmitted between the SSD and the CPU; and monitoring a connection status of a data port corresponding to the SSD and send a monitoring result to the CPU.

Another aspect of the present disclosure provides an electronic device. The electronic device, comprising: an SSD (solid state drive); a CPU (central processing unit); and an apparatus for implementing SSD data interaction. The apparatus comprises at least a master controller, a detector and a retimer coupled between the SSD and the CPU for: performing signal enhancement processing on information transmitted between the SSD and the CPU; and monitoring a connection status of a data port corresponding to the SSD and send a monitoring result to the CPU.

The electronic device comprises an SSD (solid state drive), a CPU (central processing unit), and an apparatus for implementing SSD data interaction. The apparatus comprises a monitoring management module and a signal enhancement module that are coupled between the SSD and the CPU. The signal enhancement module is configured to perform signal enhancement processing on information transmitted between the SSD and the CPU. The monitoring management module is configured to monitor a connection status of a data port corresponding to the SSD and send a monitoring result to the CPU.

Another aspect of the present disclosure provides a method for implementing SSD (solid-state drive) data interaction for an apparatus comprising a master controller, a detector and a retimer both coupled between an SSD and a CPU (central processing unit). The method comprising: acquiring connection status information of a data port corresponding to the SSD; and sending the connection status information of the data port corresponding to the SSD or the connection status information of the data port corresponding to the SSD that undergoes enhancement processing to the CPU.

Other aspects of the present disclosure can be understood by those skilled in the art in light of the description, the claims, and the drawings of the present disclosure.

BRIEF DESCRIPTION OF THE DRAWINGS

To more clearly illustrate technical solutions in embodiments of the present disclosure, drawings needed for descriptions of the disclosed embodiments or the prior art are briefly introduced hereinafter. Obviously, the drawings described below are only some embodiments of the present disclosure but not all embodiments, and it is possible for those ordinarily skilled in the art to derive other drawings from such drawings without creative effort.

DETAILED DESCRIPTION

With reference to the accompanying drawings, specific embodiments of the present disclosure will be illustrated more fully hereinafter. However, such embodiments are not intended to be limiting of the present disclosure. It should be understood that, various modifications can be made to the embodiments disclosed herein, and modifications obtainable by those ordinary skilled in the relevant art shall all fall within the spirit and scope of the present disclosure.

The accompanying drawings included in the specification and forming a part of the specification are intended to illustrate the disclosed embodiments. Together with the aforementioned brief summary section and the detailed description section hereinafter, the accompanying drawings serve to explain the principles of the present disclosure.

Through descriptions of non-limiting embodiments of the present disclosure hereinafter with reference to the accompanying drawings, the above-described and other features of the present disclosure will be more obvious. It should be further understood that, though the present disclosure is described with reference to certain specific embodiments, those skilled in the relevant art may implement various other equivalent embodiments comprising characteristics or features described in the appended claims, all of which fall within the protection scope defined herein.

In the specification, terms such as "in one embodiment", "in another embodiment", "in an additional embodiment", or "in other embodiments" may all refer to one or more the same or different embodiments of the present disclosure.

The present disclosure provides an apparatus for implementing solid-state drive (SSD) data interaction. The apparatus for implementing SSD data interaction may support both the hardware managed hot plug and the software managed hot plug.

Further, the disclosed apparatus for implementing SSD data interaction may be configured to monitor the connection and disconnection of a solid-state drive (hereinafter referred to as 'SSD'), thereby notifying the CPU of the related connection status information of the SSD. By using the disclosed apparatus, data transmission and control between the CPU and the SSD may be realized.

Figure 1:
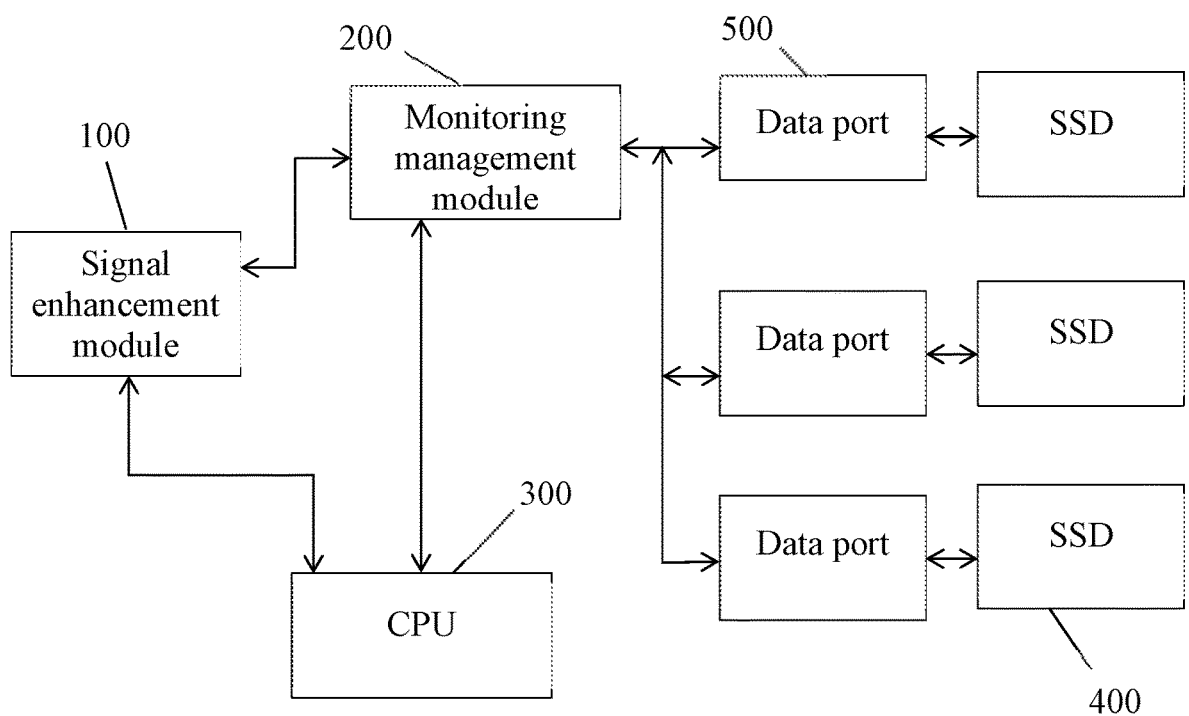
FIG. 1 illustrates a structural schematic view of an apparatus for implementing solid-state drive (SSD) data interaction consistent with disclosed embodiments.

FIG. 1 illustrates a structural schematic view of an apparatus for implementing SSD data interaction consistent with disclosed embodiments. As shown in FIG. 1, the apparatus for implementing SSD data interaction may include a signal enhancement module 100 and a monitoring management module 200.

More specifically, the signal enhancement module 100 may be configured to perform signal enhancement processing on any received data information or control information, thereby facilitating subsequent signal processing operations. For example, the signal enhancement module 100 may be coupled between a CPU 300 and a SSD 400, so as to perform signal enhancement processing on information signals (e.g., the data information or control information) transmitted from the CPU 300 to the SSD 400. The signal enhancement module 100 may further send the information signals that undergo the signal enhancement processing to the SSD 400 or other electronic devices.

The signal enhancement module 100 may be further configured to perform signal enhancement processing on the data information stored in the SSD 400. Further, the signal enhancement module 100 may transmit the data information that undergoes the signal enhancement processing to the CPU 300.

Optionally, the signal enhancement processing may include enhancing the signal strength and, more specifically, the signal enhancement processing may refer to processing of a signal in a way of signal amplification. In one embodiment, the signal enhancement module 100 may include a Retimer chip configured for signal processing (e.g., signal enhancement).

Further, the monitoring management module 200 may be configured to monitor a connection status of a data port 500 corresponding to the SSD 400, and to send the monitoring result to the CPU 300. Optionally, the connection status of the data port 500 corresponding to the SSD 400 may include a connected status and a disconnected status. The connection status of the data port 500 may be used to determine the connection status of the SSD 400. That is, if the connection status of the data port 500 is the connected status, the connection status of the SSD 400 corresponding to the data port 500 is the connected status, and if the connection status of the data port 500 is the disconnected status, the connection status of the SSD 400 corresponding to the data port 500 is the disconnected status.

In one example, the monitoring management module 200 may be coupled to the signal enhancement module 100, the CPU 300, and the SSD 400. The monitoring management module 200 may receive the information signals (e.g., the data information or the control information) from the signal enhancement module 100 that completes the signal enhancement processing, or receive the information signals directly from the CPU 300 without undergoing the signal enhancement processing.

Further, the monitoring management module 200 may be configured to transmit the data information received from the signal enhancement module 100 or the CPU 300 to the SSD 400, or to execute an operation on the SSD 400 based on the control information received from the signal enhancement module 100 or the CPU 300. The operation executed by the monitoring management module 200 on the SSD 400 may specifically refer to an operation of reading the data in the SSD 400, or an operation of monitoring the connection status of the SSD 400, etc.

Optionally, instead of one data port 500, a plurality of data ports 500 may be configured according to the present disclosure. Each data port 500 may be connected to a corresponding SSD 400, and the plurality of data ports 500 may together form a hardware interface module.

More specifically, the monitoring management module 200 may monitor whether the SSD 400 is connected to the data port 500 in real-time, and send the connected status or disconnected status of the SSD 400 and the data port 500 to the CPU 300 for management. The connected status may correspond to a situation where the SSD 400 is connected to the data port 500, and the disconnected status may correspond to a situation where no SSD 400 is connected to the data port 500. For example, the monitoring management module 200 may transmit connection status information of each data port 500 to the CPU 300 via the signal enhancement module 100 or via a data bus (e.g., the inter-integrated circuit bus, "I2C bus" for short).

Further, based on the information fed back by each data port 500, the monitoring management module 200 may determine whether a SSD 400 is connected to a corresponding data port 500. For example, the data port 500 may return identifying information including "1" or "0". When "1" is returned, the monitoring management module 200 may determine that the SSD 400 is connected to the data port 500, and when "0" is fed back, the monitoring management module 200 may determine that no SSD 400 is connected to the data port 500 or the SSD 400 is disconnected from the data port 500.

Further, the monitoring management module 200 may read the data status information of each or any SSD 400. The data status information of a SSD 400 may include capacity information, temperature information, and model information, etc. of the SSD 400. Further, the detected data status information may be self-stored, and may be transmitted to the CPU 300 for management. In one embodiment, the SSD 400 may be an NVMe (Non-Volatile Memory Express) hard drive.

Further, the apparatus for implementing SSD data interaction may be configured in any electronic device. For example, the disclosed apparatus for implementing SSD data interaction may be configured to establish connection and data transmission with the CPU or the SSD in the electronic device.

Further, the corresponding data flow is described in detail hereinafter. The CPU 300 may generate request information that requests the connection status of each SSD 400. The signal enhancement module 100 may perform enhancement processing on the request information and send the processed request information to the monitoring enhancement module 200. The monitoring management module 200 may read the identifying information of each data port 500 based on the request information received from the signal enhancement module 100 that undergoes the enhancement processing or based on the request information received from the CPU 300 without the enhancement processing.

Based on the identifying information of each data port 500, the monitoring management module 200 may further determine the connection status between each data port 500 and the corresponding SSD 400. Further, the monitoring management module 200 may feedback the connection status information of the SSD 400 at each data port 500 to the CPU 300.

Optionally, in another embodiment, the monitoring management module 200 may be connected to the signal enhancement module 100 and the CPU 300 via the data bus after passing a bus switch. The CPU 300 may generate the request information that reads the data status information of each SSD 400. The monitoring management module 200 may, based on the received request information that undergoes the enhancement processing by the signal enhancement module 100 or based on the request information received directly from the CPU 300, obtain the data status information of each SSD 400.

Further, the monitoring management module 200 may send the obtained data status information of each SSD 400 back to the CPU 300. Or, the data status information of the SSD 400 may be sent back to the CPU 300 after undergoing the enhancement processing performed by the signal enhancement module 100.

Figure 2:
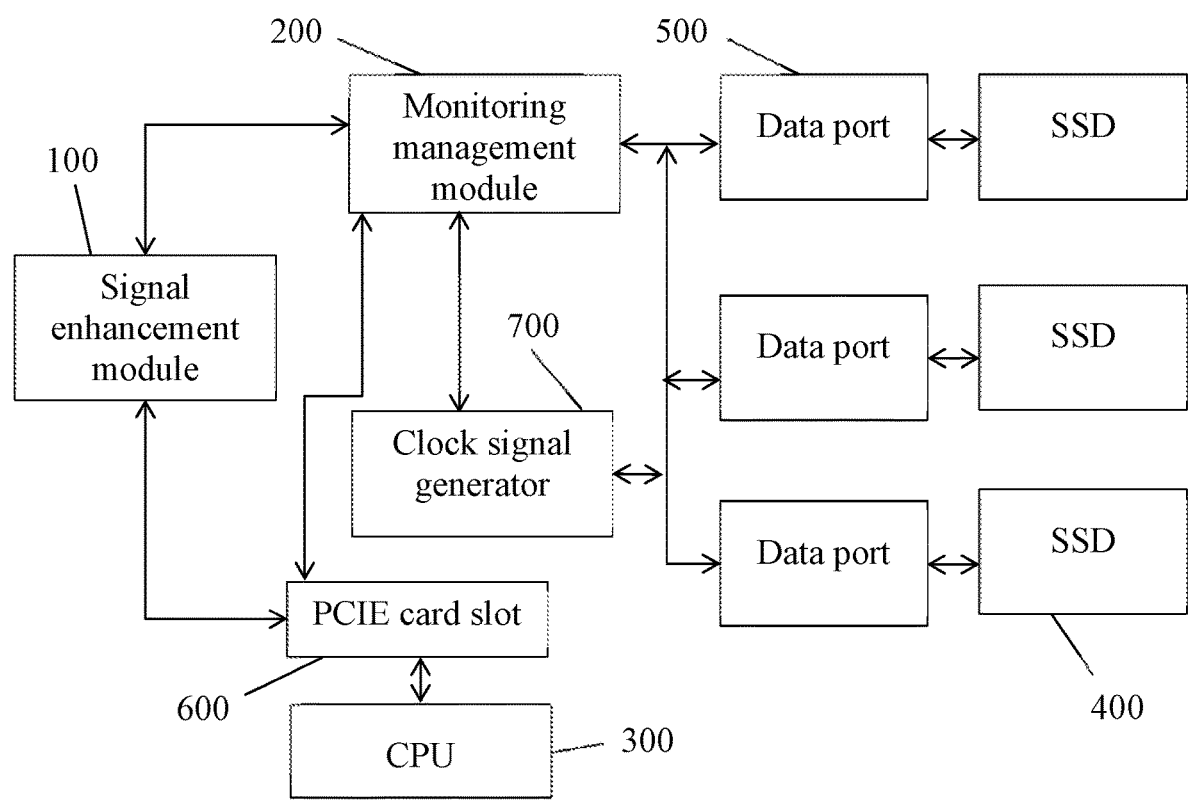
FIG. 2 illustrates a structural schematic view of another apparatus for implementing solid-state drive (SSD) data interaction consistent with disclosed embodiments.

FIG. 2 illustrates a structural schematic view of another apparatus for implementing solid-state drive (SSD) data interaction consistent with disclosed embodiments. As shown in FIG. 2, the apparatus for implementing SSD data interaction may include a signal enhancement module 100 and a monitoring management module 200. Optionally, the apparatus for implementing SSD data interaction may further include a clock signal generator 700.

The clock signal generator 700 may be coupled between the CPU 300 and the SSD 400. For example, the clock signal generator 700 may be coupled to the CPU 300 and the data port 500, respectively. Further, the clock signal generator 700 may be configured to, when information is transmitted between the CPU 300 and the SSD 400, load a clock signal into the information that is transmitted between the CPU 300 and the SSD 400.

More specifically, the monitoring management module 200 may, based on a clock control command sent by the CPU 300 or a preset self-configured clock control command, control the clock signal generator 700 to load the clock signal into the information that is transmitted between the CPU 300 and the SSD 400.

In one embodiment, the disclosed apparatus for implementing the SSD data interaction may further include a PCIE card slot 600. The monitoring management module 200 and the signal enhancement module 100 may be respectively connected to the CPU 300 via the PCIE card slot 600. That is, different ports of the PCIE card slot 600 may be connected to the monitoring management module 200, the signal enhancement module 100, and the CPU 300, thereby realizing transmission of the information.

By using the aforementioned apparatus, enhancement processing may be performed on the transmitted information via the signal enhancement module, and monitoring on the connection status of the SSD may also be realized via the monitoring management module, such that timely feedback may be provided to the CPU. Further, according to the present disclosure, the software managed hot plug function and the hardware managed hot plug function may be implemented, and the objective of a low cost hot plug function may be acquired.

Figure 3:
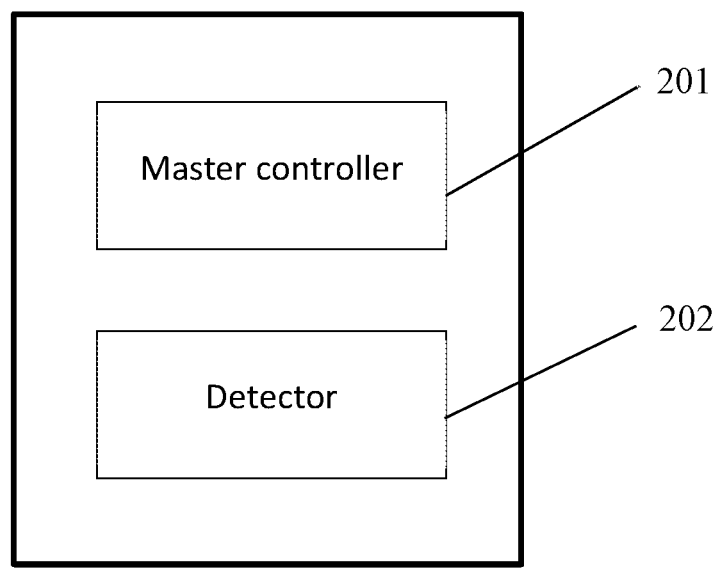
FIG. 3 illustrates a structural schematic view of a monitoring management module consistent with disclosed embodiments.

FIG. 3 illustrates a structural schematic view of a monitoring management module consistent with disclosed embodiments. As shown in FIG. 3, the monitoring management module 200 may include a master controller 201, and a detector 202. The detector 202 may be coupled to the master controller 201. Further, the detector 202 and the master controller 201 may be connected to each SSD 400, respectively.

More specifically, the detector 202 may monitor whether an SSD 400 is connected to each data port 500. That is, the detector 202 may be configured to detect the connection status of each SSD 400. Further, the detector 202 may transmit the detected connection status information of the SSD 400 to the master controller 201 or the CPU 300.

On one hand, by connecting the master controller 201 to the CPU 300, the connection status information of the SSD 400 may be sent to the CPU 300 via the data bus. On the other hand, the detector 202 may be directly connected to the CPU 300 via the data bus, thereby transmitting the connection status information of each SSD 400 to the CPU 300.

As described in the aforementioned embodiments, the detector 202 may monitor whether an SSD 400 is connected to the data port 500 in real-time, and send the connected status or disconnected status between the SSD 400 and the data port 500 to the CPU 300 and the master controller 201 for management. For example, the detector 202 may transmit the connection status information of each data port 500 to the CPU 300 via the signal enhancement module 100. Or, the detector 202 may transmit the connection status information of each data port 500 to the CPU 300 via the data bus (I2C bus).

Optionally, the connection status information of each data port 500 may be sent to the CPU 300 via the master controller 201. Or, the connection status information of each data port 500 may be sent to the CPU 300 via the master controller 201 after being processed by the signal enhancement module 100.

Further, the detector 202 may determine whether an SSD 400 is connected to a corresponding data port 500 based on the information fed back by each data port 500. For example, the data port 500 may feedback identifying information including "1" or "0". When "1" is fed back, the monitoring management module 200 may determine that the SSD 400 is connected to the data port 500, and when "0" is fed back, the monitoring management module 200 may determine that no SSD 400 is connected to the data port 500 or the SSD 400 is disconnected from the data port 500.

In one embodiment, the detector 202 may be coupled to the clock signal generator 700. The clock signal generator 700 may, based on a clock enabling signal of each data port 500 sent by the detector 202, load a clock signal into the information transmitted between the CPU 300 and the SSD 400. That is, the clock signal generator 700 may, based on the corresponding enabling signal, select to load the corresponding clock signal or choose to not load any clock signal.

For example, when the received enabling signal of the corresponding data port 500 has a low voltage level, the clock signal may not be loaded into the data transmitted by the data port 500. When the received enabling signal of the corresponding data port 500 has a high voltage level, the clock signal may be loaded into the data transmitted by the data port 500. Optionally, the loaded clock signal may be generated and controlled by the detector 202.

Further, the detector 202 may, based on the control of the master controller 201, send a resetting signal to each or any SSD 400, thereby resetting the SSD 400. Further, the master controller 201 may, based on the control command of the CPU 300, send a control signal that controls the detector 202 to execute a resetting operation on the SSD 400 to the detector 202. The master controller 201 may further acquire the data status information of each SSD 400. The acquired data status information of each SSD 400 may be sent to the CPU 300 via the data bus. Or, the acquired data status information may be sent to the CPU 300 after being processed by the signal enhancement module 100.

Similarly, the data status information may include the capacity information, the temperature information, and the model information, etc. of each SSD 400. Further, the master controller 201 and the detector 202 may be formed by a programmable logic control (PLC) device.

As such, in the disclosed apparatus for implementing SSD data interaction, by integrating the monitoring management module and the signal enhancement module, both the software managed hot plug function and hardware managed hot plug function may be realized. Further, the objective of a low cost hot plug solution may be obtained.

The present disclosure further provides an electronic device to which the aforementioned apparatus for implementing the SSD data interaction applies. Other than the aforementioned monitoring management module 200 and the signal enhancement module 100, the electronic device may further include a CPU 300 and a SSD 400.

The CPU 300 and the SSD 400 in the electronic device may establish data communication and connection via the apparatus for implementing the SSD data interaction described in the aforementioned embodiments. Further, the connection status and data status information of the SSD 400 may be monitored, and the software managed hot plug and the hardware managed hot plug of the SSD 400 may be realized and monitored.

In one embodiment, the disclosed electronic device may be a cell phone, a computer, or any other handheld smart terminal device. Optionally, the electronic device may comprise a plurality of SSD 400, and each SSD 400 may establish data communication and connection with the CPU 300. The connection status and data status information of the SSD 400 may be monitored, and the software managed hot plug and the hardware managed hot plug of each SSD 400 may be realized and monitored.

Because the principles of realizing the apparatus for implementing SSD data interaction in the electronic device is similar to the principles described in the aforementioned embodiments, repeated descriptions are not provided herein.

Figure 4:
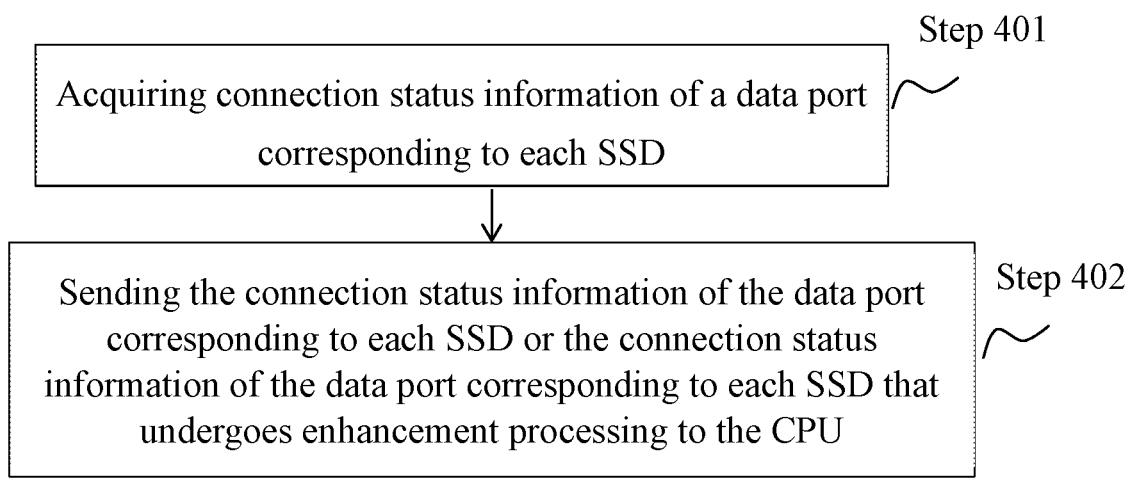
FIG. 4 illustrates a flow chart of a method for implementing solid-state drive (SSD) data interaction consistent with disclosed embodiments.

FIG. 4 illustrates a flow chart of a method for implementing SSD data interaction consistent with disclosed embodiments. As shown in FIG. 4, the method may include the following steps (Step 401~Step 402):

Step 401, acquiring connection status information of a data port 500 corresponding to each SSD 400; and Step 402, sending the connection status information of the data port 500 corresponding to each SSD 400 or the connection status information of the data port 500 corresponding to each SSD 400 that undergoes enhancement processing to the CPU 300.

According to the present disclosure, the monitoring management module 200 may, based on the request information of the CPU 300, execute an operation of acquiring the connection status information of the data port 500 corresponding to each SSD 400, or execute an operation of acquiring data status information of the data port 500 corresponding to each SSD 400. Further, the monitoring management module 200 may, after the signal enhancement module 100 performs enhancement processing on the connection status information of each data port 500, transmit the processed connection status information of each data port 500 to the CPU 300. Or, the connection status information of each data port 500 may be transmitted to the CPU 300 via the data bus (I2C bus).

Further, acquiring the connection status information of a data port 500 corresponding to each SSD 400 may further include: acquiring the connection status information of the SSD 400 by receiving the feedback information of each data port 500. More specifically, the monitoring management module 200 may receive identifying information including "1" or "0" fed back by the data port 500. When "1" is fed back, the monitoring management module 200 may determine that the SSD 400 is connected to the data port 500, and when "0" is fed back, the monitoring management module 200 may determine that no SSD 400 is connected to the data port 500 or the data port 500 is disconnected from the SSD 400.

More specifically, The CPU 300 may generate request information that requests the connection status of each SSD 400. The signal enhancement module 100 may perform enhancement processing on the request information and send the processed request information to the monitoring enhancement module 200. The monitoring management module 200 may read the identifying information of each data port 500 based on the received request information that undergoes the enhancement processing or based on the request information directly received from the CPU 300. Further, the monitoring management module 200 may, based on the identifying information of each data port 500, determine the connection status between each data port 500 and the SSD 400, thereby feeding back the connection status information of the SSD 400 at each data port 500 to the CPU 300.

In one embodiment, the monitoring management module 200 may be connected to the signal enhancement module 100 and the CPU 300 after passing the bus switch via the data bus. Further, the CPU 300 may generate the request information that reads the data status information of each SSD 400. The monitoring management module 200 may, based on the received request information that undergoes the enhancement processing by the signal enhancement module 100 or based on the request information received directly from the CPU 300, execute to acquire the data status information of the SSD 400.

The acquired data status information of the SSD 400 may be sent back to the CPU 300. Or, the acquired data status information of the SSD 400 may be sent back to the CPU 300 after undergoing the enhancement processing by the signal enhancement module 100.

In one embodiment, when data transmission is executed between the monitoring management module 200 and the SSD 400, a clock signal may be loaded into the data that is transmitted between the monitoring management module 200 and the SSD 400. More specifically, the monitoring management module 200 may, based on the clock control command sent by the CPU 300 or the self-configured clock control command, control the clock signal generator 700 to load a clock signal into the information transmitted between the CPU 300 and the SSD 400 when the CPU 300 and the SSD 400 perform information transmission.

Further, the disclosed method for implementing SSD data interaction may be applied to the aforementioned apparatus for implementing SSD data interaction. Further, the specific principles of the method are basically the same as the principles that support the disclosed apparatus. Thus, the specific process is not repeated herein.

As such, a signal enhancement module and a monitoring management module may be included in the disclosed apparatus for implementing SSD data interaction. By configuring a signal enhancement module (e.g., Retimer chip) between the CPU and a SSD, signals transmitted between the CPU and the SSD may have an enhanced strength. Further, by configuring the monitoring management module, a connection status of a data port corresponding to the SSD may be monitored. The SSD in the disclosed embodiments may, for example, be an NVMe hard drive that uses the PCIE slot(s), where the NVMe hard drive is believed to bring satisfying improvement in various aspects with respect to the existing technologies. According to the present disclosure, the SSD (e.g., NVMe hard drive) may be designed into a form of AIC (add-in card), and the functions of signal enhancement and management of hot plug of the NVMe hard drive may be implemented.

With reference to the accompanying drawings and the detailed descriptions, the above-described and other aspects, features, and advantages of the present disclosure will become more apparent. The disclosed embodiments are only a part of the disclosed embodiments, and may be implemented in various ways. The known or repeated functions and structures are not described hereinafter to avoid unnecessary or surplus details that obscure the present disclosure. Further, the specific structural or functional details of the present disclosure are not intended to be limiting, but are only used as the basis of the claims for educating those skilled in the relevant art to implement the present disclosure in various ways using any appropriate specific structures.

Those ordinarily skilled in the art may realize that each apparatus, device, or method described in the disclosed embodiments may be implemented using electronic hardware, or may be implemented via integration of the computer software and the electronic hardware. Whether such functions are executed in the hardware or the software manner depends on the specific application and designing restrictions of the disclosed technical solutions. Those skilled in the art may use different methods to implement the above-described functions for a specific application. However, such implementation shall not be considered as departing from the scope of the present disclosure.

Those skilled in the art may clearly understand that, for ease and concision of the descriptions, the aforementioned data or signal processing method may be applied to the disclosed electronic devices, and the related details may refer to corresponding descriptions in the disclosed product embodiments, which are not repeated herein. The aforementioned embodiments are merely exemplary embodiments of the present disclosure and are not intended to be limiting of the present disclosure, and the protection scope of the present disclosure is defined by the appended claims. Those skilled in the relevant art may obtain various modifications or equivalent replacements of the present disclosure within the spirit and protection scope of the present disclosure. Such modifications or equivalent replacement shall all be regarded as falling within the scope of the present disclosure.

What is claimed is:

1. An apparatus for implementing SSD (solid-state drive) data interactions, comprising:
a master controller coupled to an SSD and a CPU (central processing unit);
a detector coupled to the master controller and the SSD;
a retimer coupled between the SSD and the CPU; and
a clock signal generator coupled between the SSD and the CPU and coupled to the detector;
wherein:
the detector is configured to monitor connection status information of the SSD, and transmit the connection status information of the SSD to the master controller;
the master controller is configured to send the connection status information of the SSD to the CPU via a data bus;
the retimer is configured to perform signal enhancement processing on information transmitted between the SSD and the CPU;
the master controller and the detector are configured to monitor a connection status of a data port corresponding to the SSD and send a monitoring result to the CPU; and
the clock signal generator is configured to:
in response to that an enabling signal of the data port sent from the detector has a high voltage level, select to load a clock signal to the information; and
in response to that the enabling signal has a low voltage level, select to not load the clock signal to the information.

2. The apparatus according to claim 1, wherein:
the master controller is further configured to acquire data status information of the SSD, and
the master controller is further configured to send the connection status information of the SSD transmitted by the detector and the data status information of the SSD to the CPU via the data bus.

3. The apparatus according to claim 1, wherein:
the detector is further coupled to the CPU to transmit the connections status information of the SSD to the CPU.

4. The apparatus according to claim 1, the detector is further configured to send a resetting signal to the SSD to reset the SSD.

5. The apparatus according to claim 1, further comprising:
a peripheral component interconnect express (PCIE) card slot,
wherein the master controller, the detector, and the retimer are coupled to the CPU via the PCIE card slot, respectively.

6. The apparatus according to claim 1, wherein:
the detector and the master controller are configured to monitor a connection status of the SSD by receiving feedback information of the data port.

7. An electronic device, comprising:
an SSD (solid state drive);
a CPU (central processing unit); and
an apparatus for implementing SSD data interactions and comprising:
a master controller coupled to the SSD and the CPU,
a detector coupled to the master controller and the SSD,
a retimer coupled between the SSD and the CPU, and
a clock signal generator coupled between the SSD and the CPU and coupled to the detector;
wherein:
the detector is configured to monitor connection status information of the SSD, and transmit the connection status information of the SSD to the master controller;
the master controller is configured to send the connection status information of the SSD to the CPU via a data bus;
the retimer is configured to perform signal enhancement processing on information transmitted between the SSD and the CPU;

the master controller and the detector are configured to monitor a connection status of a data port corresponding to the SSD and sending a monitoring result to the CPU; and the clock signal generator is configured to:
  in response to that an enabling signal of the data port sent from the detector has a high voltage level, select to load a clock signal to the information; and
  in response to that the enabling signal of the data port sent from the detector has a low voltage level, select to not load the clock signal to the information.

8. The electronic device according to claim 7, wherein:
the master controller is further configured to acquire data status information of the SSD, and
the master controller is further configured to send the connection status information of the SSD transmitted by the detector and the data status information of the SSD to the CPU via the data bus.

9. The electronic device according to claim 7, wherein:
the detector is further coupled to the CPU to transmit the connection status information of the SSD to the CPU.

10. The electronic device according to claim 7, wherein the detector is further configured to send a resetting signal to the SSD to reset the SSD.

11. The electronic device according to claim 7, wherein:
the apparatus for implementing SSD data interactions further comprises a peripheral component interconnect express (PCIE) card slot, and
the master controller and the detector are coupled to the CPU via the PCIE card slot, respectively.

12. The electronic device according to claim 7, wherein:
the master controller and the detector are further configured to monitor a connection status of the SSD by receiving feedback information of the data port.

13. A method for implementing SSD (solid-state drive) data interactions for an apparatus comprising a master controller, a detector, a retimer coupled between an SSD and a CPU (central processing unit), and a clock signal generator coupled between the SSD and the CPU and coupled to the detector, the method comprising:
  acquiring connection status information of a data port corresponding to the SSD by receiving feedback information of the data port;
  sending the connection status information of the data port corresponding to the SSD or the connection status information of the data port corresponding to the SSD that undergoes enhancement processing to the CPU; and
  selecting to load a clock signal to information transmitted between the SSD and CPU in response to that an enabling signal of the data port sent from the detector has a high voltage level, and selecting to not load the clock signal to the information in response to that the enabling signal has a low voltage level.

14. The method according to claim 13, wherein before acquiring the connection status information of the data port corresponding to the SSD, the method further comprises:
  generating, by the CPU, request information that requests the connection status information of the SSD.

15. The method according to claim 14, wherein before acquiring the connection status information of the data port corresponding to the SSD, and after generating, by the CPU, the request information that requests the connection status information of the SSD, the method further comprises:
  performing signal enhancement on the request information, and
  sending the request information that undergoes signal enhancement to the monitoring management module.

16. The apparatus according to claim 2, wherein the data status information includes at least one of capacity information of the SSD, temperature information of the SSD, or model information of the SSD.

17. The electronic device according to claim 8, wherein the data status information includes at least one of capacity information of the SSD, temperature information of the SSD, or model information of the SSD.

* * * * *